(12) United States Patent
Gabrielsson

(10) Patent No.: US 11,033,858 B2
(45) Date of Patent: Jun. 15, 2021

(54) COMBINED SOOT FILTER AND UREA HYDROLYSIS

(71) Applicant: Umicore AG & Co. KG, Hanau-Wolfgang (DE)

(72) Inventor: Paer Gabrielsson, Helsingborg (SE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 28 days.

(21) Appl. No.: 16/622,921

(22) PCT Filed: Jun. 14, 2018

(86) PCT No.: PCT/EP2018/065856
§ 371 (c)(1),
(2) Date: Dec. 16, 2019

(87) PCT Pub. No.: WO2018/229214
PCT Pub. Date: Dec. 20, 2018

(65) Prior Publication Data
US 2021/0146305 A1 May 20, 2021

(30) Foreign Application Priority Data
Jun. 16, 2017 (DK) .......................... PA 2017 00351

(51) Int. Cl.
*B01D 53/94* (2006.01)
*B01J 35/04* (2006.01)
*B01J 21/06* (2006.01)
*B01J 21/04* (2006.01)
*B01J 21/08* (2006.01)
*B01J 29/40* (2006.01)
*B01J 23/42* (2006.01)
*B01J 23/44* (2006.01)
*B01J 35/00* (2006.01)
*F01N 3/035* (2006.01)
*F01N 3/28* (2006.01)
*F01N 3/20* (2006.01)

(52) U.S. Cl.
CPC ....... *B01D 53/9472* (2013.01); *B01D 53/944* (2013.01); *B01D 53/9418* (2013.01); *B01D 53/9477* (2013.01); *B01J 21/04* (2013.01); *B01J 21/063* (2013.01); *B01J 21/066* (2013.01); *B01J 21/08* (2013.01); *B01J 23/42* (2013.01); *B01J 23/44* (2013.01); *B01J 29/40* (2013.01); *B01J 35/0006* (2013.01); *B01J 35/04* (2013.01); *F01N 3/035* (2013.01); *F01N 3/2066* (2013.01); *F01N 3/2803* (2013.01); *B01D 2255/808* (2013.01); *B01D 2255/904* (2013.01); *B01D 2255/9032* (2013.01); *B01D 2255/9155* (2013.01); *F01N 2370/02* (2013.01); *F01N 2610/02* (2013.01)

(58) Field of Classification Search
CPC .............. B01D 46/002; B01D 46/0021; B01D 46/0027; B01D 46/0041; B01D 46/2418; B01D 53/56; B01D 53/565; B01D 53/8631; B01D 53/9472; B01D 2201/62; B01D 2251/2067; B01D 2251/2255; B01D 2251/9032; B01D 2255/915; B01D 2255/9155; B01D 2257/404; B01D 2258/012; B01J 19/0046; F01N 3/0222; F01N 3/035; F01N 3/206; F01N 3/2066; F01N 13/017; F01N 2240/40; F01N 2250/02; F01N 2410/00; F01N 2570/14; F01N 2610/02
See application file for complete search history.

(56) References Cited

U.S. PATENT DOCUMENTS

| 6,896,000 | B2 * | 5/2005 | Brenner | ................ F01N 3/0878 137/597 |
|---|---|---|---|---|
| 2009/0145117 | A1 | 6/2009 | Doring | |
| 2012/0247092 | A1 | 10/2012 | Boorse | |
| 2014/0161679 | A1 * | 6/2014 | Chiffey | .............. B01D 53/9477 422/170 |

FOREIGN PATENT DOCUMENTS

| DE | 102005012066 A1 | 9/2006 | |
| DE | 10335265 B4 * | 2/2014 | ............. B60K 15/03 |
| EP | 1985819 A2 | 10/2008 | |
| GB | 2 452 613 A * | 3/2009 | ........... F01N 3/2066 |
| WO | 2008122023 A1 | 10/2008 | |

OTHER PUBLICATIONS

International Search Report received in PCT/EP2018/065856 dated Sep. 7, 2018.
Written Opinion received in PCT/EP2018/065856 dated Sep. 7, 2018.

* cited by examiner

Primary Examiner — Timothy C Vanoy
(74) Attorney, Agent, or Firm — Suzannah K. Sundby, Esq.; Canady + Lortz LLP

(57) ABSTRACT

A monolith filter unit for exhaust gas cleaning combines urea hydrolysis with particle filtering.

21 Claims, 2 Drawing Sheets

COMBINED SOOT FILTER AND UREA HYDROLYSIS

Figure 1:
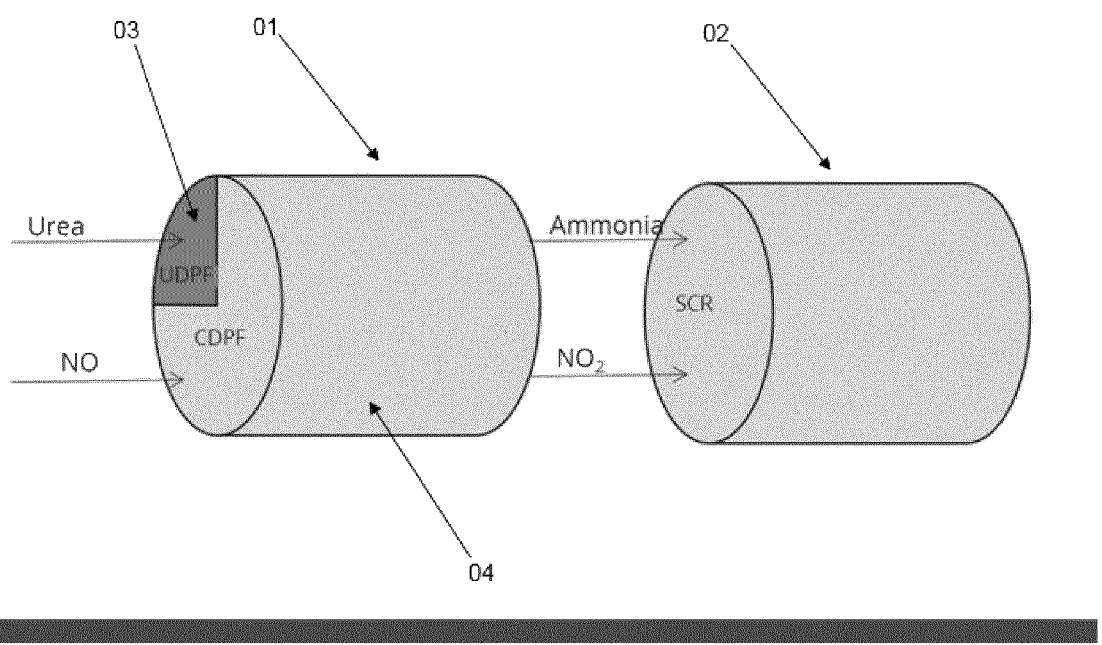

The present invention is a system to integrate a Urea Decomposition Particle Filter (UDPF) and a Catalyst Diesel Particle Filter (CDPF), especially for exhaust gas cleaning.

The invention addresses the problem of complexity and bulkiness of exhaust gas cleaning systems. The present invention presents a more compact and less complex exhaust gas cleaning system.

Today truck manufacturers are using a urea hydrolysis mixer, which is a special tube in which the urea is evaporated and partly decomposed and thereafter hydrolysed on the SCR catalyst. In the filter of the present invention, the urea is hydrolysed to two ammonia molecules directly in the UDPF part of the filter with a fraction of the exhaust gas, while, another fraction of the exhaust gas is passed through the CDPF part of the filter where NO is reacted to NO2. The UDPF could be coated with a urea hydrolysis catalyst, but even without coating, the monolith has some hydrolysis activity. Up-stream the UDPF filter fraction, a urea spray is directed towards the UDPF fraction area of the filter; this may be enabled using a shield or a guide for the urea spray. The NO2 produced in the CDPF fraction of the filter is not used for soot filter regeneration, but for improving the low temperature performance of the SCR(Selective Catalytic Reduction) catalyst located downstream the filter. A mixer may be located upstream the SCR catalyst and downstream the UDPF/CDPF to improve a homogenous mix of the NH3 and NO2 exiting the UDPF/CDPF.

The invention is useful for the cleaning of exhaust gas of an engine, for instance, but not exclusively diesel engine exhaust.

The invention provides a catalyst impregnated exhaust gas particulate filter unit which is suited for vehicle exhaust gas cleaning. According to an embodiment of the invention, the unit comprises at least one monolith which comprises a plurality of channels. The channels are open at one end, to let the exhaust gas in, but closed at the other end, to force the exhaust gas through the filter wall of the monolith to exit the unit, thereby filtering the exhaust gas. The monolith itself has two open ends, a first end for the exhaust gas to enter and a second end which the exhaust gas exits after it has been filtered through the filter wall of the monolith. To enclose the monolith, protecting it and enabling it to be mounted in an exhaust gas system, the filter unit further comprises at least one wall adapted to fit around the at least one monolith.

Essential for the invention is, that the at least one monolith is divided in two sections. The first section, the UDPF is particularly adapted to facilitate the urea hydrolysis to two ammonia molecules directly as described above. This first section may be coated with a first type of catalyst which is suited for the urea hydrolysis, but it may also not be coated, because ceramics of the filter may help the hydrolysis of urea. Examples of hydrolysis catalysts are: ZrO2, TiO2, Al2O3, H-ZSM-5 or SiO2. The second section, the CDPF, of the at least one monolith is coated with a second type of catalyst which is suited for the reaction of NO to NO2. In one embodiment this second type of catalyst is a diesel oxidation catalyst. Examples of diesel oxidation catalysts are: $Pt/Al_2O_3$; $(Pt, Pd)/Al_2O_3$; $Pt/TiO_2$; or $(Pt, Pd)/TiO_2$ in an amount of 0-50 $g/ft^3$ precious metals.

In an embodiment of the invention, the filter unit has a cylindrical shape and the first section has the shape of a sector of a circle when seen in a cross sectional view of the filter unit. In this embodiment, the impregnation of the filter with catalyst may be performed by screening the section of the filter which is not to be impregnated. In further embodiments, the first section may have the shape of a segment of a circle or it may have the shape of a circle, within the outer circle of the filter unit cross sectional viewed.

In a further embodiment of the invention, the filter unit comprises a flow guide which is located upstream of the first section. The flow guide is adapted to guide a part of the exhaust gas stream only to the first section and isolate this part of the exhaust gas stream from the rest of the exhaust gas stream flowing to the one or more monolith. Just before or within the flow guide, urea may be injected to the part of the exhaust gas stream flowing within the flow guide. Hence, the flow guide provides more exact directing of the injected urea to the first (UDPF) section of the at least one monolith. The flow guide may be in the form of a duct or a pipe.

In a further embodiment of the invention the filter unit comprises a mixer arranged downstream of the at least one monolith (comprising the first and second section). The mixer is adapted to mix the exhaust gas stream from the first and the second section.

In embodiments where the filter unit comprises a plurality of monoliths, the monoliths may be arranged in serial or parallel connection relative to the fluid flow through the filter unit. Consequently, when the monoliths are parallel connected in the filter unit, they are arranged side by side over the inner cross sectional area of the filter unit relative to the fluid flow direction from the first to the second open end of the filter unit. When the monoliths are serial connected, they are arranged one after the other in the fluid flow direction. It is also possible that the plurality of monoliths are arranged both serial and parallel within the filter unit, i.e. both side by side across the cross sectional area of the filter unit and one after the other in the fluid flow direction. The filter unit comprises at least one wall which is adapted to fit around the one or more monolith(s). The number of walls depends on the shape of the filter unit. A filter unit with a circular or ellipsoid cross sectional shape comprises a single monolith surrounding wall, whereas a filter unit with a rectangular cross sectional shape comprises four walls and a filter unit with a triangular cross sectional shape comprises three walls.

FEATURES OF THE INVENTION

1. Catalyst impregnated exhaust gas particulate filter unit for vehicle exhaust gas, the unit comprises
   at least one monolith comprising a plurality of channels open at one end and closed at the other end,
   a first open end,
   a second open end, wherein the at least one monolith is divided in two sections, a first section which is not coated or which is coated with a first type of catalyst and a second section which is coated with a second type of catalyst.

2. Catalyst impregnated exhaust gas particulate filter unit according to feature 1, wherein the first type of catalyst is a urea hydrolysis catalyst.

3. Catalyst impregnated exhaust gas particulate filter unit according to any of the preceding features, wherein the second type of catalyst is a diesel oxidation catalyst.

4. Catalyst impregnated exhaust gas particulate filter unit according to any of the preceding features, wherein the filter unit has a cylindrical shape and the first section has the shape of a sector of a circle when seen in a cross sectional view of the filter unit.

5. Catalyst impregnated exhaust gas particulate filter unit according to any of the features 1-3, wherein the filter unit has a cylindrical shape and the first section has the shape of a segment of a circle when seen in a cross sectional view of the filter unit.

6. Catalyst impregnated exhaust gas particulate filter unit according to any of the features 1-3, wherein the first section has the shape of a circle when seen in a cross sectional view of the filter unit.

7. Catalyst impregnated exhaust gas particulate filter unit according to any of the preceding features, wherein the unit further comprises a flow guide upstream the first section adapted to guide a part of the exhaust gas stream only to the first section and isolate this part of the exhaust gas stream from the rest of the exhaust gas stream.

8. Catalyst impregnated exhaust gas particulate filter unit according to any of the preceding features, wherein the filter unit further comprises a mixer arranged downstream the first and second section adapted to mix the exhaust gas stream from the first section with the exhaust gas stream from the second section.

9. Process for vehicle exhaust gas cleaning comprising the steps of
providing a catalyst impregnated exhaust gas particulate filter unit for vehicle exhaust gas comprising at least one monolith comprising a plurality of channels open at one end and closed at the other end, a first open end, a second open end, at least one wall adapted to fit around said at least one monolith, wherein the at least one monolith is divided in two sections, a first section which is not coated or which is coated with a first type of catalyst and a second section which is coated with a second type of catalyst,
providing a vehicle exhaust gas upstream the first open end of the unit
injecting urea into a partial stream of the vehicle exhaust gas, upstream the first section of the at least one monolith.

10. Process according to feature 9, further including the step of providing a fluid guide upstream the first section of the at least one monolith for the partial stream, adapted to guide the partial stream to the first section of the at least one monolith.

11. Process according to feature 9 or 10, further including the step of providing a mixer downstream the filter unit and mixing the flow of fluids comprising NO2 and NH3 exiting the first and the second section of the filter unit.

12. Process according to any of the features 9-11, further including the step of providing an SCR unit downstream the filter unit.

A more detailed description of the invention will be apparent from the following description of a specific embodiment with reference to the drawings in which—

Figure 2:
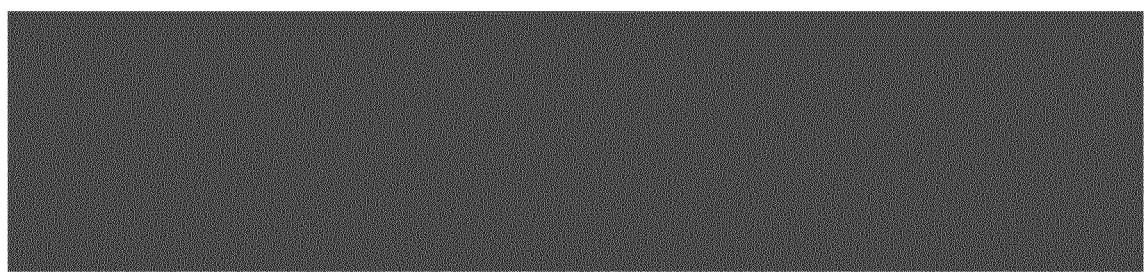
Figure 2:
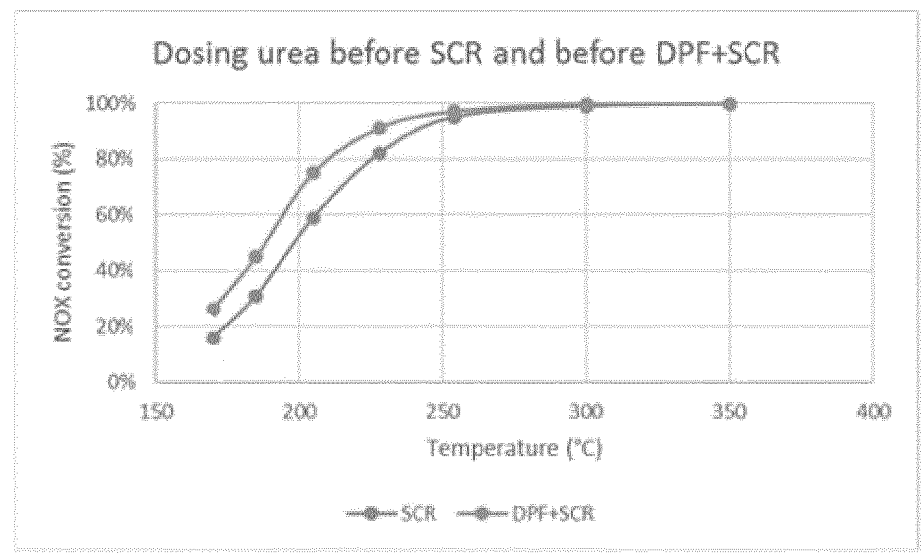

FIG. 1 shows an isometric view of the filter unit upstream an SCR catalyst unit, and FIG. 2 shows a graph of the performance of the invention.

POSITION NUMBERS

01. Filter unit.
02. SCR catalyst unit
03. First section (UDPF) of the monolith(s).
04. Second section (CDPF) of the monolith(s).

Referring to FIG. 1, a filter unit 01 according to an embodiment of the invention is shown with the monolith inside it. The filter unit of this embodiment has one cylindrical cassette wall not shown adapted to enclose the sides of the monolith to be mounted inside it and to fix the monolith against movement relative to the wall. When the monolith is mounted within the wall, it is adapted to receive an exhaust gas to be cleaned in the monolith. The monolith is separated in two sections. In the first section 03 a sector of the cross sectional area of the cylindrical monolith is the UDPF. In the second section 04, the rest of the monolith is the CDPF. The exhaust gas enters the filter unit through the first open end. One stream of exhaust gas with urea injected enters the first section and another stream of exhaust gas comprising NO enters the second section. The gas streams flows into the monolith which comprises a plurality of channels with a closed end, hence, the gas streams flows through the filter sides of the monolith to exit through the second open end of the filter unit in a gas stream comprising ammonia and NO2. To homogenize the gas exiting the filter unit before it enters the SCR, a mixer (not shown) may be employed downstream the filter unit and upstream the SCR.

FIG. 2 shows how experiments have shown a higher NOX conversion when the urea is injected into the exhaust gas stream before the (U)DPF as according to the present invention than if the urea is injected into the exhaust gas stream before the SCR (downstream the UDPF).

The invention claimed is:

1. A catalyst impregnated exhaust gas particulate filter unit for vehicle exhaust gas, the unit comprises
at least one monolith comprising a plurality of channels open at one end and closed at the other end,
a first open end, and
a second open end,
wherein the at least one monolith is divided in two sections, a first section which is not coated or which is coated with a first type of catalyst and a second section which is coated with a second type of catalyst, and
wherein the filter unit has a cylindrical shape and the first section has the shape of a sector or segment of a circle when seen in a cross sectional view of the filter unit.

2. The catalyst impregnated exhaust gas particulate filter unit according to claim 1, wherein the first type of catalyst is a urea hydrolysis catalyst.

3. The catalyst impregnated exhaust gas particulate filter unit according to claim 2, wherein the urea hydrolysis catalyst is at least one of $ZrO_2$, $TiO_2$, $Al_2O_3$, H-ZSM-5, or $SiO_2$.

4. The catalyst impregnated exhaust gas particulate filter unit according to claim 1, wherein the second type of catalyst is a diesel oxidation catalyst.

5. The catalyst impregnated exhaust gas particulate filter unit according to claim 4, wherein the diesel oxidation catalyst is at least one of $Pt/Al_2O_3$; $(Pt, Pd)/Al_2O_3$; $Pt/TiO_2$; or $(Pt, Pd)/TiO_2$ in an amount of 0-50 $g/ft^3$ precious metals.

6. A catalyst impregnated exhaust gas particulate filter unit for vehicle exhaust gas, the unit comprises
at least one monolith comprising a plurality of channels open at one end and closed at the other end,
a first open end, and
a second open end,
wherein the at least one monolith is divided in two sections, a first section which is not coated or which is coated with a first type of catalyst and a second section which is coated with a second type of catalyst, and
wherein the unit further comprises a flow guide upstream the first section adapted to guide a part of the exhaust gas stream only to the first section and isolate this part of the exhaust gas stream from the rest of the exhaust gas stream.

7. The catalyst impregnated exhaust gas particulate filter unit according to claim 6, wherein the first type of catalyst is a urea hydrolysis catalyst.

8. The catalyst impregnated exhaust gas particulate filter unit according to claim 7, wherein the urea hydrolysis catalyst is at least one of $ZrO_2$, $TiO_2$, $Al_2O_3$, H-ZSM-5, or $SiO_2$.

9. The catalyst impregnated exhaust gas particulate filter unit according to claim 6, wherein the second type of catalyst is a diesel oxidation catalyst.

10. The catalyst impregnated exhaust gas particulate filter unit according to claim 9, wherein the diesel oxidation catalyst is at least one of $Pt/Al_2O_3$; $(Pt, Pd)/Al_2O_3$; $Pt/TiO_2$; or $(Pt, Pd)/TiO_2$ in an amount of 0-50 g/ft$^3$ precious metals.

11. The catalyst impregnated exhaust gas particulate filter unit according to claim 6, wherein the first section has the shape of a circle or a sector or segment thereof when seen in a cross sectional view of the filter unit.

12. A catalyst impregnated exhaust gas particulate filter unit for vehicle exhaust gas, the unit comprises
at least one monolith comprising a plurality of channels open at one end and closed at the other end,
a first open end, and
a second open end,
wherein the at least one monolith is divided in two sections, a first section which is not coated or which is coated with a first type of catalyst and a second section which is coated with a second type of catalyst, and
wherein the filter unit further comprises a mixer arranged downstream the first and second section adapted to mix the exhaust gas stream from the first section with the exhaust gas stream from the second section.

13. The catalyst impregnated exhaust gas particulate filter unit according to claim 12, wherein the first type of catalyst is a urea hydrolysis catalyst.

14. The catalyst impregnated exhaust gas particulate filter unit according to claim 13, wherein the urea hydrolysis catalyst is at least one of $ZrO_2$, $TiO_2$, $Al_2O_3$, H-ZSM-5, or $SiO_2$.

15. The catalyst impregnated exhaust gas particulate filter unit according to claim 12, wherein the second type of catalyst is a diesel oxidation catalyst.

16. The catalyst impregnated exhaust gas particulate filter unit according to claim 15, wherein the diesel oxidation catalyst is at least one of $Pt/Al_2O_3$; $(Pt, Pd)/Al_2O_3$; $Pt/TiO_2$; or $(Pt, Pd)/TiO_2$ in an amount of 0-50 g/ft$^3$ precious metals.

17. The catalyst impregnated exhaust gas particulate filter unit according to claim 12, wherein the first section has the shape of a circle or a sector or segment thereof when seen in a cross sectional view of the filter unit.

18. A process for vehicle exhaust gas cleaning comprising the steps of
providing a catalyst impregnated exhaust gas particulate filter unit for vehicle exhaust gas comprising at least one monolith comprising a plurality of channels open at one end and closed at the other end, a first open end, a second open end, at least one wall adapted to fit around said at least one monolith, wherein the at least one monolith is divided in two sections, a first section which is not coated or which is coated with a first type of catalyst and a second section which is coated with a second type of catalyst,
providing a vehicle exhaust gas upstream the first open end of the unit,
injecting urea into a partial stream of the vehicle exhaust gas, upstream the first section of the at least one monolith, and
providing a fluid guide upstream the first section of the at least one monolith for the partial stream, adapted to guide the partial stream to the first section of the at least one monolith.

19. The process according to claim 18, further including the step of providing an SCR unit downstream the filter unit.

20. A process for vehicle exhaust gas cleaning comprising the steps of
providing a catalyst impregnated exhaust gas particulate filter unit for vehicle exhaust gas comprising at least one monolith comprising a plurality of channels open at one end and closed at the other end, a first open end, a second open end, at least one wall adapted to fit around said at least one monolith, wherein the at least one monolith is divided in two sections, a first section which is not coated or which is coated with a first type of catalyst and a second section which is coated with a second type of catalyst,
providing a vehicle exhaust gas upstream the first open end of the unit,
injecting urea into a partial stream of the vehicle exhaust gas, upstream the first section of the at least one monolith, and
providing a mixer downstream the filter unit and mixing the flow of fluids comprising $NO_2$ and $NH_3$ exiting the first and the second section of the filter unit.

21. The process according to claim 20, further including the step of providing an SCR unit downstream the filter unit.

* * * * *